United States Patent
Sun et al.

(10) Patent No.: US 9,154,256 B2
(45) Date of Patent: Oct. 6, 2015

(54) CLOCK PHASE DETECTION IN THE FREQUENCY DOMAIN

(71) Applicant: Infinera Corporation, Sunnyvale, CA (US)

(72) Inventors: Han H. Sun, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/042,390

(22) Filed: Sep. 30, 2013

(65) Prior Publication Data

US 2015/0023659 A1 Jan. 22, 2015

Related U.S. Application Data (60) Provisional application No. 61/856,943, filed on Jul. 22, 2013.

(51) Int. Cl.
*H04L 7/027* (2006.01)
*H04J 14/02* (2006.01)
*H04B 10/61* (2013.01)

(52) U.S. Cl.
CPC ........ *H04J 14/0221* (2013.01); *H04B 10/6165* (2013.01); *H04L 7/027* (2013.01)

(58) Field of Classification Search
CPC ............................ H04B 10/6165; H04L 7/027
USPC .................................................. 398/154–155
See application file for complete search history.

(56) References Cited

U.S. PATENT DOCUMENTS

| | | | | |
|---|---|---|---|---|
| 5,235,622 A | * | 8/1993 | Yoshida | 375/355 |
| 2004/0008395 A1 | * | 1/2004 | McBrien et al. | 359/238 |
| 2012/0086492 A1 | * | 4/2012 | Sun et al. | 327/299 |
| 2012/0219302 A1 | * | 8/2012 | Sun et al. | 398/208 |
| 2014/0105616 A1 | * | 4/2014 | Yan et al. | 398/208 |

FOREIGN PATENT DOCUMENTS

JP 2008052784 A * 3/2008

OTHER PUBLICATIONS

Sano et al, "102.3-Tb/s (224X548-Gb/s) Cand Extended L-band All-Raman Transmission over 240 KM Using PDM-64QAM Single Carrier FDM with digital Pilot Tone", OFC/NFOEC, Mar. 4-8, 2012.*
Sun et al., "A Novel Dispersion and PMD Tolerant Clock Phase Detector for Coherent Transmission Systems," OMJ4.pdf, OSA/OFC/NFOEC 2011, 3 total pages.
Yan et al., "Digital Clock Recovery Algorithm for Nyquist Signal," OTu2I.7.pdf, OFC/NFOEC Technical Digest 2013, Mar. 17, 2013-Mar. 21, 2013, 3 total pages.
Gardner, "A BPSK/QPSK timing-Error Detector for Sampled Receivers," IEEE Transactions on Communications, vol. COM-34, No. 5, May 1986, pp. 423-429.

* cited by examiner

*Primary Examiner* — Leslie Pascal
(74) *Attorney, Agent, or Firm* — Harrity & Harrity LLP; David L. Soltz (57) ABSTRACT

A digital signal processor (DSP) may receive samples of a signal from an analog-to-digital converter (ADC); convert the samples from a time domain to a frequency domain; determine a clock phase error of the samples while in the frequency domain; and provide a voltage corresponding to the clock phase error. The voltage may be provided to reduce timing errors associated with the samples.

15 Claims, 8 Drawing Sheets

CLOCK PHASE DETECTION IN THE FREQUENCY DOMAIN

RELATED APPLICATION

This application claims priority to U.S. Provisional Patent Application No. 61/856,943, filed Jul. 22, 2013, the disclosure of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator configured to modulate the output of the laser, and a multiplexer to combine each of the modulated outputs (e.g., to form a combined output or WDM signal). Dual-polarization (DP) (also known as polarization multiplex (PM)) is sometimes used in coherent optical modems. A Tx PIC may include a polarization beam combiner (PBC) to combine two optical signals into a composite DP signal.

A WDM system may also include a receiver circuit having a receiver (Rx) PIC. The Rx PIC may include a polarization beam splitter (PBS) to receive an optical signal (e.g., a WDM signal), split the received optical signal, and provide two optical signals (e.g., associated with orthogonal polarizations) associated with the received optical signal. The Rx PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

In a WDM system, the transmitter circuit may modulate a phase of a signal in order to convey data (via the signal) to the receiver circuit where the signal may be demodulated such that the data, included in the signal, may be recovered (e.g., based on the modulated phase). A transmitter circuit may include a digital signal processor (DSP) to apply pulse shaping to the signal to shape the spectrum of the signal (e.g., to minimize inter-symbol interference (ISI) and adjacent channel interference (ACI)), via a roll-off factor of Nyquist filtering. The roll-off factor can be selected to provide a trade-off between spectral efficiency and simplicity in implementation. For example, the roll-off factor may be proportional to simplicity, but inversely proportional to spectral efficiency (e.g., the amount of capacity for a given bandwidth). The roll-off factor can generally be selected in the range of approximately 0.3 to approximately 1 for dense WDM systems.

SUMMARY

According to some possible implementations, an optical system may include an analog-to-digital converter (ADC) to output samples of a signal; and a digital signal processor (DSP) to: receive the samples from the ADC, convert the samples from a time domain to a frequency domain, determine a clock phase error of the samples while in the frequency domain, and provide a voltage corresponding to the clock phase error. The voltage may be provided to reduce timing errors associated with the samples.

According to some possible implementations, an optical system may include a DSP to receive samples of a signal from an ADC, convert the samples from a time domain to a frequency domain, determine a clock phase error of the samples while in the frequency domain; and provide a voltage corresponding to the clock phase error. The voltage may be provided to reduce timing errors associated with the samples.

According to some possible implementations, an optical system may include an ADC to output samples of a signal. The signal may be associated with a roll-off factor in a range of approximately 0.001 to approximately 0.3. The optical system may include a DSP to receive the samples from the ADC; convert the samples from a time domain to a frequency domain; identify linear phase response differences between linear phase responses of frequency bins, associated with the samples, separated by ½T, where T is a symbol period, associated with the signal, and 1/T is a symbol rate or baud rate associated with the signal, to determine a clock phase error of the samples while in the frequency domain; and provide a voltage corresponding to the clock phase error. The voltage may be provided to reduce timing errors associated with the samples.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Systems and/or methods, as described herein, may provide a clock phase detector that may detect a timing error (e.g., a clock phase error) associated with a signal while in the frequency domain. In some implementations, the clock phase error can be determined when the signal has a roll-off factor as low as approximately 0.001. For example, the clock phase error can be determined when the signal has a roll-off factor in a range of approximately 0.001 to approximately 0.3, or when the signal has some other roll-off factors. Further, a voltage, corresponding to the clock phase error, can be provided to a clock voltage-controlled oscillator (VCO) to cause the VCO to provide a toggle sequence that may be used to reduce the clock phase error of the signal in a phase-locked loop. In some implementations, the jitter performance of the phase-locked loop may be improved in relation to the jitter performance of a phase-locked loop that includes a clock phase detector that detects a timing error in the time domain. As a result, a roll-off factor as low as approximately 0.001 may be applied to a signal, thereby increasing capacity for a given bandwidth (e.g., in relation to when the roll-off factor is greater than 0.001). That is, the roll-off factor may be minimized, thereby minimizing excess bandwidth and increasing the capacity for a given bandwidth.

Figure 1:
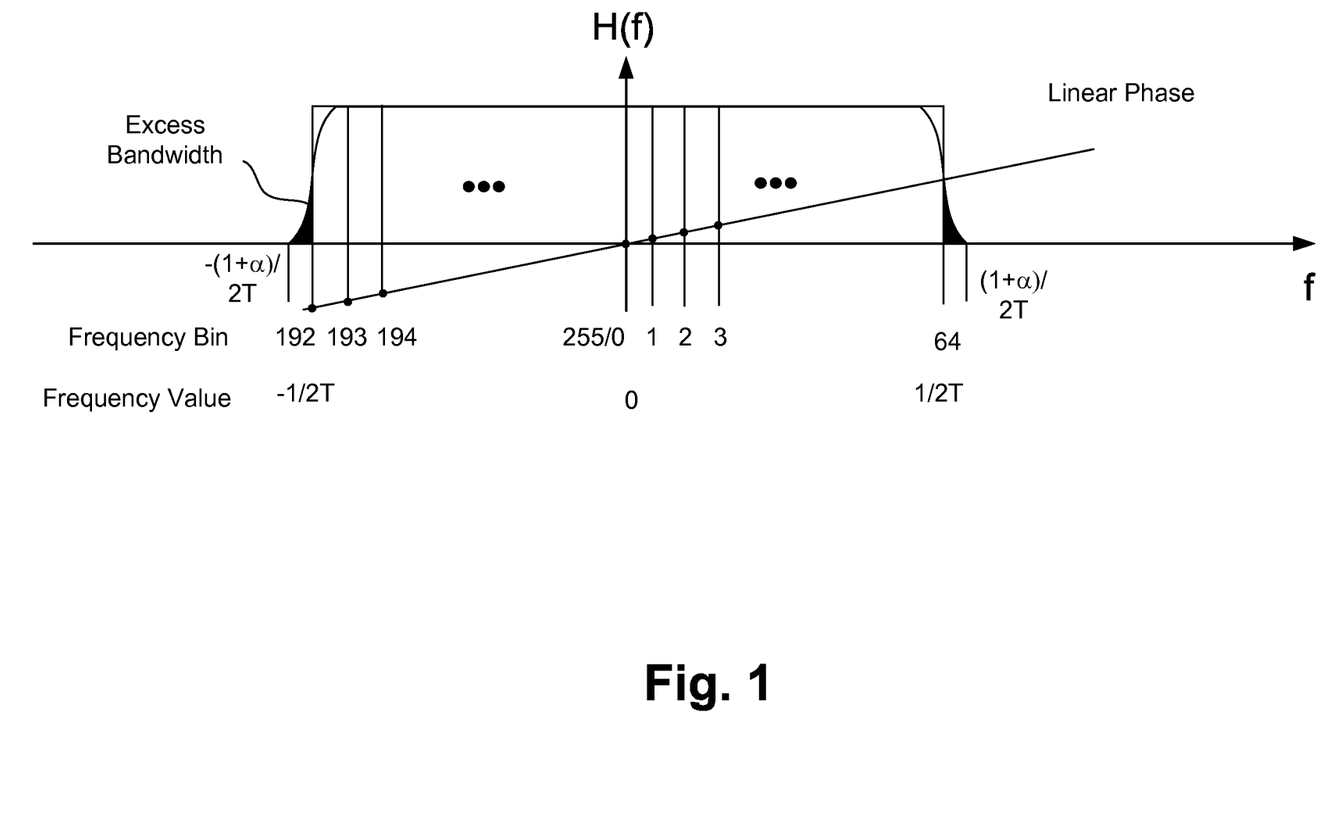
FIG. 1 illustrates an overview of an example implementation described herein.

FIG. 1 illustrates an overview of an example implementation as described herein. As shown in FIG. 1, an impulse response spectrum of a signal can be shaped to form a Nyquist spectrum having a particular roll-off factor corresponding to excess bandwidth. For example, a pulse shaping filter may be used to shape the spectrum of the signal to form the Nyquist spectrum with the particular roll-off factor. As shown in FIG. 1, the impulse response spectrum may span from a frequency range of $-\frac{1}{2}T^*(1+\alpha)$ to $\frac{1}{2}T^*(1+\alpha)$, where $\alpha$ is the roll-off factor, T is a symbol period and 1/T is the symbol rate (also known as baud rate). The impulse response of the signal may be sampled across a particular quantity of frequency bins (e.g., 256 frequency bins or some other quantity of frequency bins) as illustrated in FIG. 1 in which the sampling frequency is twice the symbol rate. As further shown in FIG. 1, a phase response of the pulse shape filter may be a linear phase response, which can also represent a timing error (e.g., a constant delay in the signal in the time domain). In some implementations, a clock phase detector may be used to determine phase response differences between the phase responses of frequency bins that are separated by $\frac{1}{2}T$.

For example, the clock phase detector may determine a difference between the phase response at frequency bin 192 and the phase response at frequency bin 0. Further, the clock phase detector may determine a difference between the phase response at frequency bin 193 and the phase response at frequency bin 1. Further, the clock phase detector may determine a difference between the phase response at frequency bin 194 and the phase response at frequency bin 2, and so on. In some implementations, the phase differences between the phase responses of frequency bins that are separated by $\frac{1}{2}T$ may be used to identify timing errors (e.g., a clock phase error) in a signal having a roll-off factor as low as approximately 0.001. In some implementations, a voltage corresponding to a clock phase error may be provided to a clock VCO that may generate a clock or toggle sequence that may be used to correct for the clock phase error when implemented in a phase-locked loop.

In some implementations, the clock phase error may be determined for a signal having components associated with either an X polarization (x-pol) or a Y polarization (y-pol). In some implementations, components, described as having the X polarization, may have the Y polarization. In some implementations, components, described as having the Y polarization, may have the X polarization. In some implementations, the X polarization may correspond to a transverse magnetic (TM) polarization and the Y polarization may correspond to a transverse electric (TE) polarization. Alternatively, the Y polarization may correspond to the TM polarization and the X polarization may correspond to the TE polarization.

Figure 2:
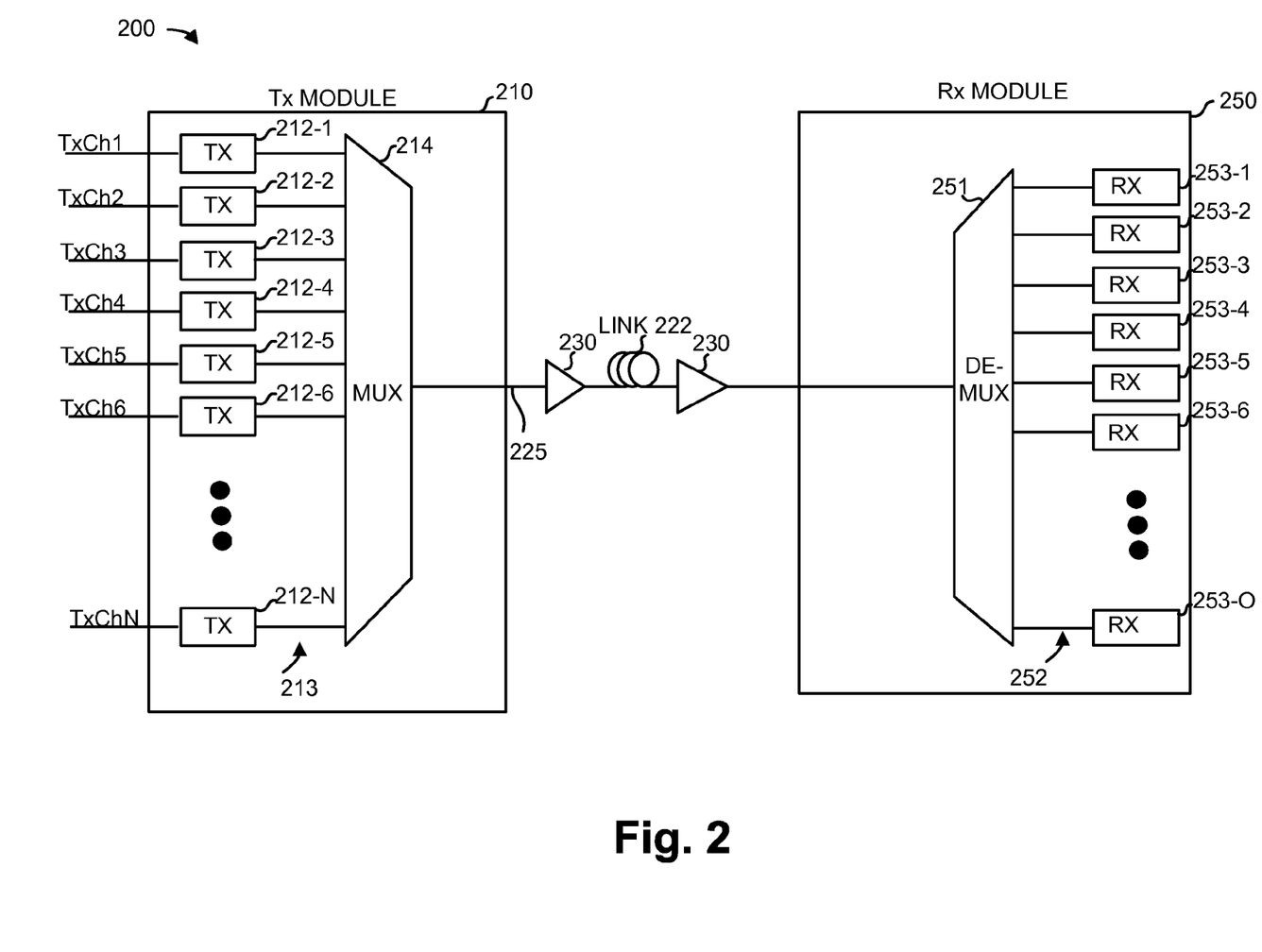
FIG. 2 is a diagram of an example network in which systems and/or methods, described herein, may be implemented.

FIG. 2 is a diagram of an example network 200 in which systems and/or methods, described herein, may be implemented. As illustrated in FIG. 2, network 200 may include transmitter (Tx) module 210 (e.g., a Tx PIC) and/or receiver (Rx) module 250 (e.g., an Rx PIC). In some implementations, transmitter module 210 may be optically connected to receiver module 250 via link 222, and/or optical amplifiers 230. Link 222 may include one or more optical amplifiers 230 that amplify an optical signal as the optical signal is transmitted over link 222.

Transmitter module 210 may include a number of optical transmitters 212-1 through 212-N (where N≥1), waveguides 213, and/or optical multiplexer 214. Each optical transmitter 212 may receive a data channel (TxCh1 through TxChN), modulate the data channel with an optical signal, and transmit the data channel as an optical signal. In one implementation, transmitter module 210 may include 5, 10, 20, 50, 100, or some other number of optical transmitters 212. Each optical transmitter 212 may be tuned to use an optical carrier of a designated wavelength. It may be desirable that the grid of wavelengths emitted by optical transmitters 212 conform to a known standard, such as a standard published by the Telecommunication Standardization Sector (ITU-T).

In some implementations, each of optical transmitters 212 may include a laser, a modulator, a semiconductor optical amplifier (SOA), a digital signal processor (DSP), and/or some other component. The laser, modulator, and/or SOA may be coupled with a tuning element (e.g., a heater) that can be used to tune the wavelength of an optical signal channel output by the laser, modulator, or SOA.

Waveguides 213 may include an optical link to transmit modulated outputs (referred to as "signal channels") of optical transmitters 212. In some implementations, each optical transmitter 212 may connect to one waveguide 213 or to multiple waveguides 213 to transmit signal channels of optical transmitters 212 to optical multiplexer 214. In some implementations, waveguides 213 may be made from a birefringent material and/or some other material.

Optical multiplexer 214 may include an arrayed waveguide grating (AWG) or some other multiplexing device. In some implementations, optical multiplexer 214 may combine multiple signal channels, associated with optical transmitters 212, into a wave division multiplexed (WDM) signal, such as optical signal 225.

As further shown in FIG. 2, receiver module 250 may include optical demultiplexer 251, waveguides 252, and/or optical receivers 253-1 through 253-O (where O≥1). In some implementations, optical demultiplexer 251 may include an AWG or some other demultiplexing device. Optical demultiplexer 251 may supply multiple signal channels based on a received WDM signal (e.g., optical signal 225). As shown in FIG. 2, optical demultiplexer 251 may supply signal channels to optical receivers 253 via waveguides 252.

Waveguides 252 may include optical links to transmit outputs of optical demultiplexer 251 to optical receivers 253. In some implementations, each optical receiver 253 may receive outputs via a single waveguide 252 or via multiple waveguides 252. In some implementations, waveguides 252 may be birefringent (e.g., based on the width of waveguides 252).

Optical receivers 253 may each operate to convert an input optical signal to an electrical signal that represents the transmitted data. In some implementations, optical receivers 253 may each include one or more photodetectors and/or related devices to receive respective input optical signals outputted by optical demultiplexer 251 and a local oscillator, convert the signals to a photocurrent, and provide a voltage output to function as an electrical signal representation of the original input signal.

While FIG. 2 shows a particular configuration of components in network 200, in practice, network 200 may include additional components, different components, or differently arranged components than what are shown in FIG. 2.

Figure 3:
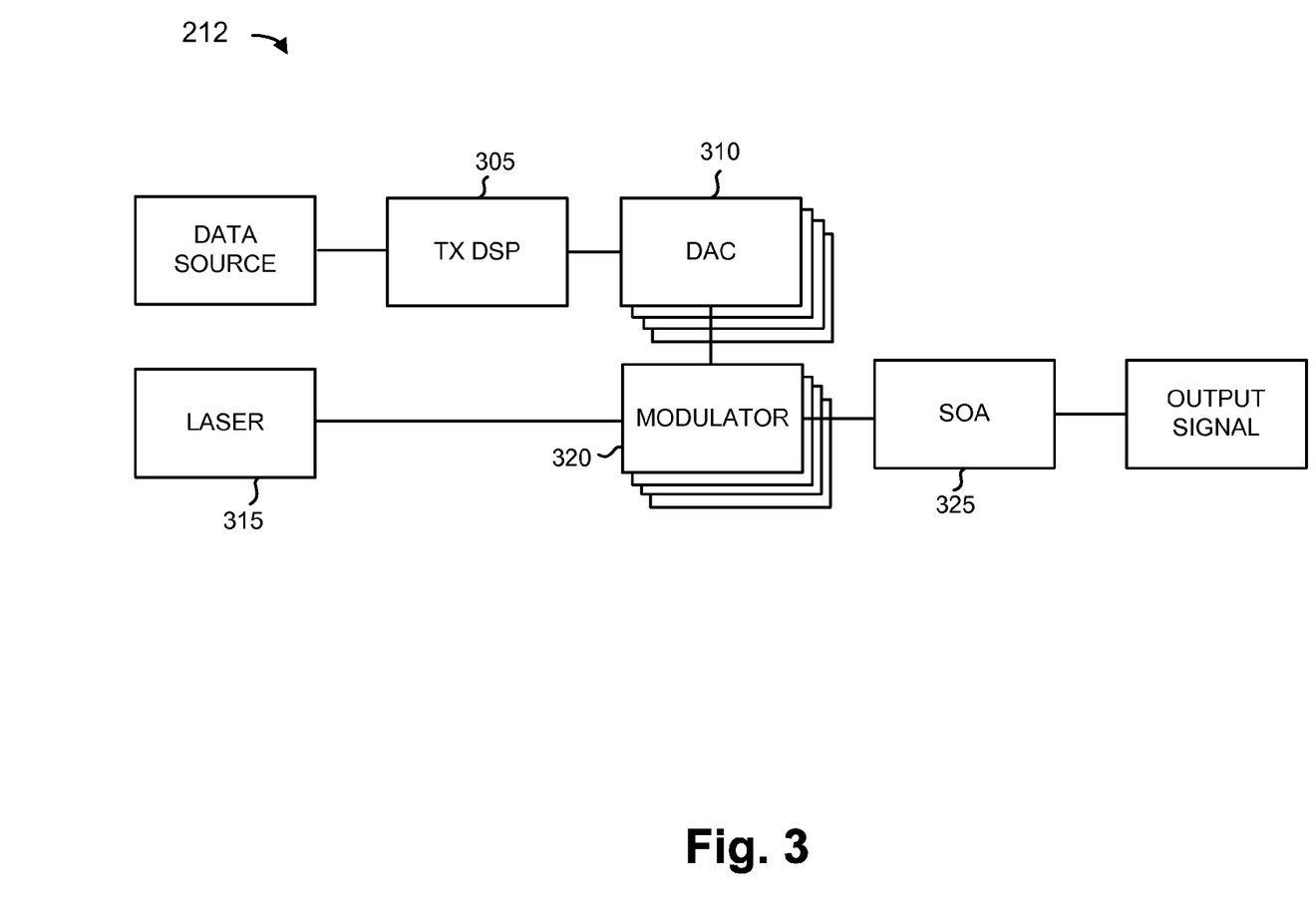
FIG. 3 is a diagram illustrating example components of an optical transmitter as shown in FIG. 2.

FIG. 3 is a diagram illustrating example elements of optical transmitter 212 as shown in network 200 of FIG. 2. As shown in FIG. 3, optical transmitter 212 may include TX digital signal processor (DSP) 305, digital-to-analog converters (DACs) 310, laser 315, modulator 320, and/or SOA 325. In some implementations, components of multiple optical transmitters 212 may be implemented on a single integrated circuit, such as a single PIC, to form a super-channel transmitter.

TX DSP 305 may include a digital signal processor or a collection of digital signal processors. In some implementations, TX DSP 305 may receive a data source (e.g., a signal received via a TX channel), process the signal, and output digital signals having symbols that represent components of the signal (e.g., an in-phase x-pol component, a quadrature (quad)-phase x-pol component, an in-phase y-pol component, and a quadrature y-pol component). In some implementations, TX DSP 305 may digitally modulate the signal by mapping bits, associated with the signal, to the symbols. In some implementations, TX DSP 305 may digitally modulate the signal using a particular modulation format (e.g., a Binary Phase Shift Keying (BPSK) modulation format, a Quadrature Phase Shift Keying (QPSK) modulation format, or some other modulation format). In some implementations, TX DSP 305 may apply spectral shaping and/or perform filtering to the signal (e.g., Nyquist spectral shaping, roll-off factor application, etc.). Additional details regarding the operations of TX DSP 305 are described with respect to FIG. 4.

DACs 310 may include a signal converting device or a collection of signal converting devices. In some implementations DACs 310 may receive respective digital signals from TX DSP 305, convert the received digital signals to analog signals, and provide the analog signals to modulators 320. The analog signals may correspond to electrical signals (e.g., voltage) to drive modulators 320.

Laser 315 may include a semiconductor laser, such as a distributed feedback (DFB) laser, or some other type of laser. Laser 315 may provide an optical signal to modulator 320. In some implementations, laser 315 may be an optical source for a single corresponding optical transmitter 212.

Figure 5A:
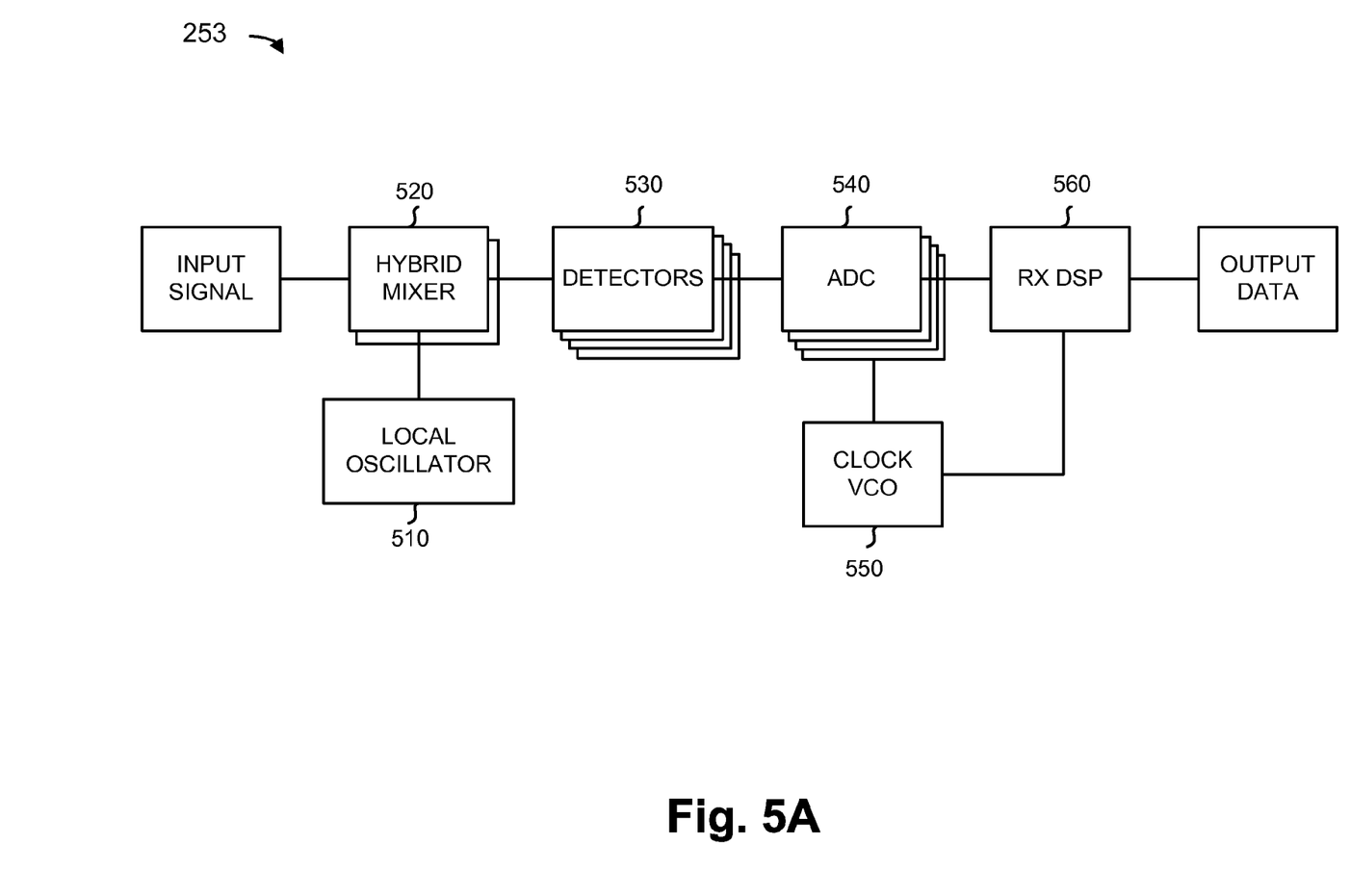
FIGS. 5A-5B are diagrams illustrating example components of an optical receiver as shown in FIG. 2.

Modulator 320 may include an optical modulator, such as an electro-absorption modulator (EAM), a pair of nested Mach-Zehnder modulators (MZMs) for each polarization, or some other type of modulator. Modulator 320 may control (modulate) the intensity, amplitude, and/or phase of an optical signal (e.g., supplied by laser 315) in order to convey data associated with the data source (e.g., via one or more optical carriers of the optical signal). For example, modulator 320 may modulate the input optical light (e.g., from laser 315) based on an input voltage signal associated with the data source (e.g., an input voltage provided by DACs 310) to form an output signal. As described below with respect to FIG. 5, the output signal may be provided to optical receiver 253 such that optical receiver 253 may compare the intensity, amplitude, and/or phase of the output signal to a reference signal in order to recover data carried by the output signal.

Modulator 320 may be formed as a waveguide with electrodes for applying an electric field, based on the input voltage signal, to the optical signal provided by laser 315. Alternatively, modulator 320 may be implemented based on other modulation technologies, such as electro-optic modulation.

In some implementations, multiple modulators 320 may be provided to modulate signals associated with particular components. For example, a first modulator 320 may be provided to modulate an in-phase x-pol component, a second modulator 320 may be provided to modulate a quadrature x-pol component, a third modulator 320 may be provided to modulate an in-phase y-pol component, and a fourth modulator may be provided to modulate a quadrature y-pol component.

SOA 325 may include an amplifying device or a collection of amplifying devices. In some implementations, SOA 325 may include an amplifier that may directly amplify an input optical signal (e.g., a signal supplied by laser 315). In some implementations, SOA 325 may be replaced by a variable optical attenuator (VOA), or by an element that combines both an SOA and a VOA.

While FIG. 3 shows optical transmitter 212 as including a particular quantity and arrangement of components, in some implementations, optical transmitter 212 may include additional components, fewer components, different components, or differently arranged components.

Figure 4:
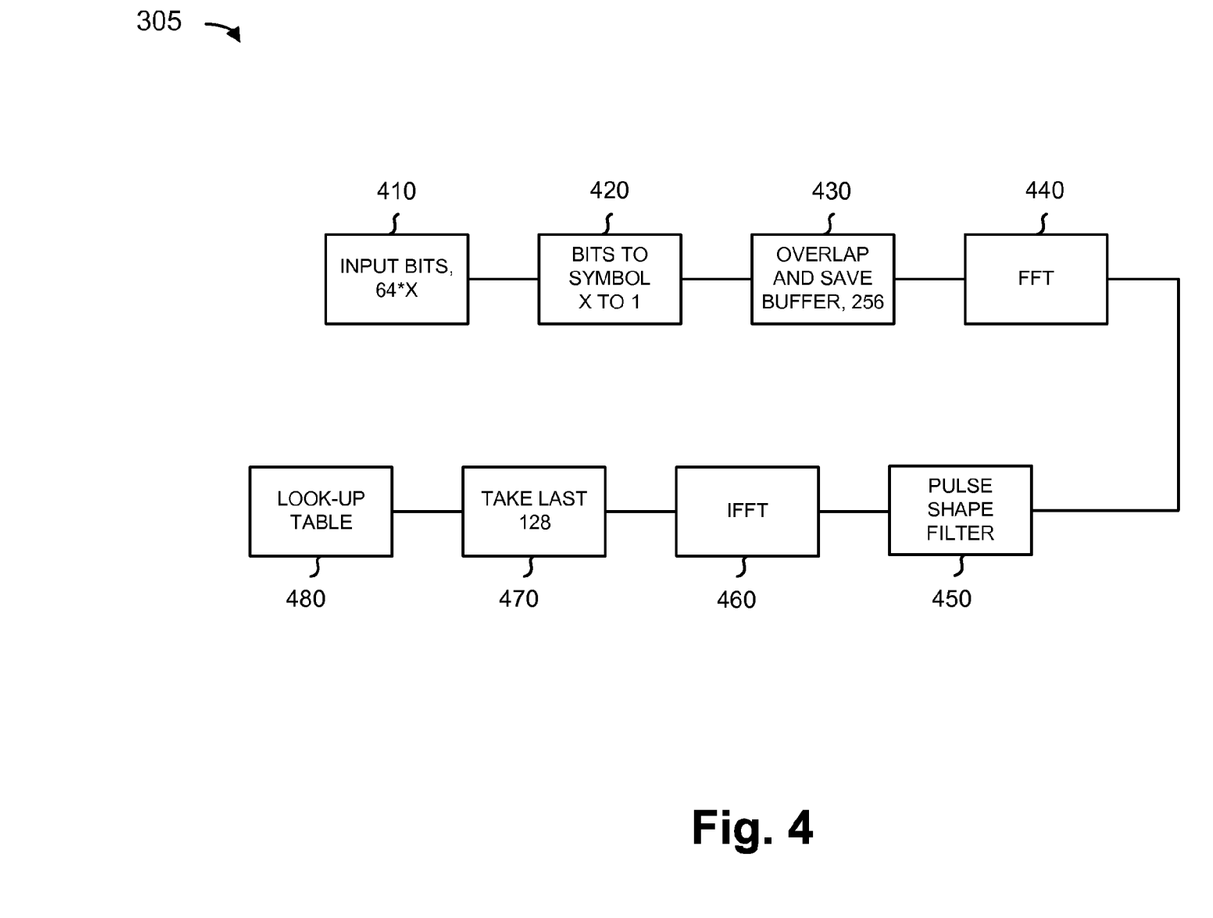
FIG. 4 illustrates example components of a transmitter digital signal processor.

FIG. 4 is a diagram illustrating example functional components of TX DSP 305. The particular functional components, which may be included in TX DSP 305, may vary based on desired performance characteristics and/or computational complexity.

As shown in FIG. 4, TX DSP 305 may include an input bits component 410, a bits to symbol component 420, an overlap and save buffer 430, a fast Fourier transform (FFT) component 440, a pulse shaping filter 450, an inverse FFT (IFFT) component 460, a take last 128 points 470 (assuming a 256-point FFT is used as an example), and a look-up table component 480.

Assuming a sampling frequency of twice the baud rate with 256-point FFT, input bits component 410 may process 64*X bits at a time of the input data, where X is an integer. For dual-polarization QPSK, X would be four. Bits to symbol component 420 may map the bits to symbols on the complex plane. For example, bits to symbol component 420 may map four bits to a symbol in the dual-polarization QPSK constellation. Overlap and save buffer 430 may buffer 256 samples. Overlap and save buffer 430 may receive 64 symbols (128 samples with zero insertion in between symbols) at a time from bits to symbol component 420. Thus, overlap and save buffer 430 may combine 64 new symbols (128 samples), from bits to symbol component 420, with the previous 128 samples received from bits to symbol component 420.

FFT component 440 may receive 256 samples from overlap and save buffer 430, and may convert the samples from the time domain to the frequency domain using, for example, a fast Fourier transform (FFT). FFT component 440 may form 256 frequency bins as a result of performing the FFT.

Pulse shape filter 450 may apply a pulse shaping filter to the 256 frequency bins. The purpose of pulse shape filter 450 is to shape the signal to the desired spectrum so that channels can be packed together on a super-channel while minimizing ISI and ACI. Pulse shape filter 450 may also be used to compensate for hardware imperfections of the TX chain or part of chromatic dispersion (if desired) induced by link 222.

In some implementations, pulse shape filter 450 may include a raised-cosine filter or some other filter to form the Nyquist spectrum and to reduce ISI of the signal. In some implementations, pulse shape filter 450 may apply coefficients to the 256 frequency bins in order to form a roll-off factor (e.g., a roll-off factor as low as approximately 0.001).

Alternatively, the roll-off factor may be over 0.001 as desired. As described in greater detail below with respect to in FIG. 6, optical receiver 253 may include a clock phase detector to identify timing errors associated with a signal filtered with a roll-off factor as low as approximately 0.001.

IFFT component 460 may receive the 256 frequency bins and return the signal back to the time domain, which may now be at the operating speed of DAC 320. In some implementations, the signal may include pilot tones. IFFT component 460 may convert the signal to the time domain using, for example, an inverse fast Fourier transform (IFFT). Take last 128 component 470 may select the last 128 samples from IFFT component 460 (256-point FFT and IFFT are used here as an example). Look-up table 480 may include a table that identifies the integers to supply to DAC 320 based on the samples from take last 128 samples from component 470. In one example implementation, look-up table 480 may include electrical field values and associated voltage signals. Look-up table 480 may use the samples to identify and output the appropriate integers. In some implementations, DAC 310 may generate voltage signals based on the integers from TX DSP 305.

While FIG. 4 shows TX DSP 305 as including a particular quantity and arrangement of functional components, in some implementations, TX DSP 305 may include additional functional components, fewer functional components, different functional components, or differently arranged functional components. For example, TX DSP 305 may include a replicator component to replicate the 256 frequency bins to form 512 frequency bins. This replication may increase the sample rate.

Figure 5B:
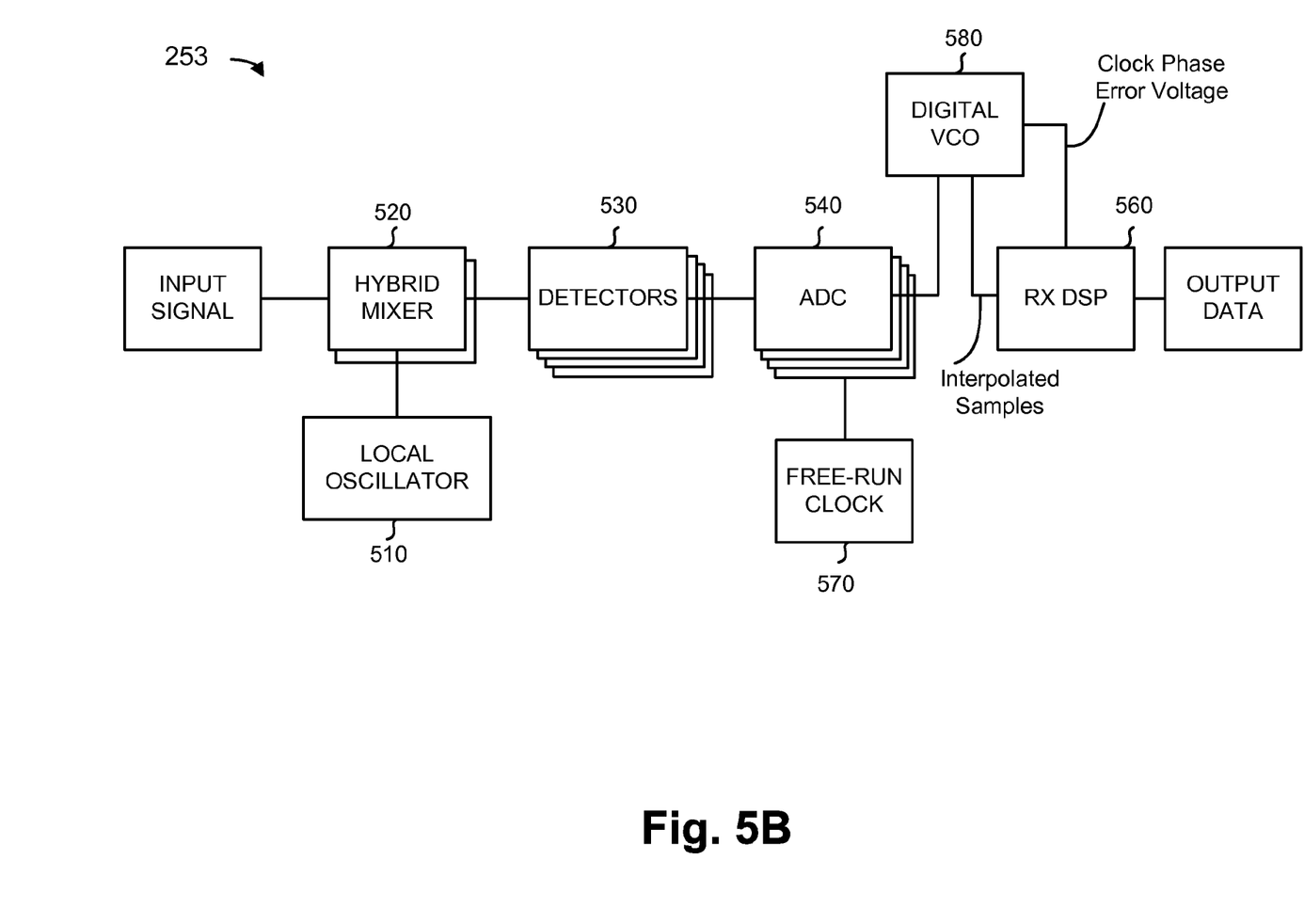

FIGS. 5A-5B are diagrams illustrating example elements of optical receiver 253 as shown in network 200 of FIG. 2. As shown in FIG. 5A, optical receiver 253 may include local oscillator 510, hybrid mixer 520, detectors 530, analog-to-digital convert (ADC) 540, clock voltage controlled oscillator (VCO) 550, and/or RX digital signal processor (DSP) 560. In some implementations, ADC 540, clock VCO 550, and RX DSP 560 may form a phase-locked loop to provide an output signal that may be based on a clock phase error provided by RX DSP 560 and a toggle sequence, corresponding to the clock phase error, provided by clock VCO 550.

In some implementations, local oscillator 510, hybrid mixer 520, and detectors 530 may be implemented on a single integrated circuit, such as a single PIC. In some implementations, ADC 540 and RX DSP 560 may be implemented using an application specific integrated circuit (ASIC).

In some implementations, local oscillator 510 may include a laser and may provide a reference signal to hybrid mixer 520. In some implementations, a phase, intensity, and/or amplitude of the reference signal may be compared to a phase, intensity, and/or amplitude of an input signal to recover data carried by the input signal.

Hybrid mixer 520 may include one or more optical devices to receive an input signal (e.g., a WDM signal supplied by optical demultiplexer 251 and corresponding to an output signal provided by transmitter module 212). In some implementations, hybrid mixer 520 may receive a reference signal from local oscillator 510. In some implementations, hybrid mixer 520 may supply components associated with the input signal and the reference optical signal to detectors 530. For example, hybrid mixer 520 may supply an in-phase x-pol component, a quadrature x-pol component, an in-phase y-pol component, and a quadrature y-pol component. In some implementations, a first hybrid mixer 520 may provide the in-phase x-pol component and the quadrature x-pol component, and a second hybrid mixer 520 may provide the in-phase y-pol component and the quadrature y-pol component.

Detectors 530 may include one or more photodetectors, such as a photodiode, to receive the output optical signal, from hybrid mixer 520, and convert the output optical signal to corresponding voltage signals. In some implementation, optical receiver 253 may include multiple detectors for in-phase x-pol components, quadrature x-pol components, in-phase y-pol components, and quadrature y-pol components. In some implementations, detectors 530 may include one or more balanced pairs of photodetectors. For example, detectors 530 may include a first pair of photodetectors to receive an in-phase x-pol component, a second pair of photo detectors to receive a quadrature x-pol component. Additionally, detectors 530 may include a third pair of photodetectors to receive an in-phase y-pol component and a fourth pair of photodetectors to receive a quadrature y-pol component.

ADC 540 may include an analog-to-digital converter that converts the voltage signals from detectors 530 to digital signals. ADC 540 may provide samples of the digital signals to RX DSP 560. In some implementations, optical receiver 253 may include four ADCs 540 or some other number of ADCs 540 (e.g., one ADC 540 for each electrical signal output by detectors 530). In some implementations, ADC 540 may receive a toggle sequence from clock VCO 550. In some implementations, the toggle sequence may identify time instances when ADC 540 is to provide the samples of the digital signals to RX DSP 560. As described in greater detail below, the toggle sequence may be based on a clock phase error determined by RX DSP 560.

Clock VCO 550 may include a voltage-controlled crystal oscillator and/or some other type of oscillation that functions as a clock generator. In some implementations, clock VCO 550 may receive a voltage, corresponding to a clock phase error, from RX DSP 560. In some implementations, clock VCO 550 may provide a toggle sequence to ADC 540, which may identify time instances when ADC 540 is to provide samples of digital signals to RX DSP 560. In some implementations, the toggle sequence may be based on the received voltage (e.g., the voltage corresponding to a clock phase error).

RX DSP 560 may include a digital signal processing device or a collection of digital signal processing devices. In some implementations, RX DSP 560 may receive samples of digital signals from ADC 540 and may process the samples to form output data associated with the input signal received by hybrid mixer 520 and detectors 530. In some implementations, RX DSP 560 may include a clock phase detector to determine a timing error (e.g., a clock phase error) in the received samples.

In some implementations, RX DSP 560 may provide a voltage, corresponding to the clock phase error, that may be used to reduce timing errors associated with the samples. For example, as shown in FIG. 5A, RX DSP 560 may provide the voltage to clock VCO 550 to cause clock VCO 550 to generate a clock, based on the voltage, that identifies time instances when ADC 540 is to provide samples of digital signals to RX DSP 560. Additional details regarding RX DSP 560 are described with respect to FIG. 6.

While FIG. 5A shows optical receiver 253 as including a particular quantity and arrangement of components, in some implementations, optical receiver 253 may include additional components, fewer components, different components, or differently arranged components.

For example, referring to FIG. 5B, optical receiver 253 may include free-run clock 570 and digital VCO 580. In some implementations, free-run clock 570 may provide a clock signal to ADC 540. In some implementations, RX DSP 560 may provide a voltage, corresponding to a clock phase error, to digital VCO 580. In some implementations, digital VCO 580 may receive samples from ADC 540, may interpolate the samples based on the received voltage (e.g., to provide interpolated samples associated with the clock phase error corresponding to the voltage), and may provide the interpolated samples to RX DSP 560.

While FIG. 5B shows optical receiver 253 as including a particular quantity and arrangement of components, in some implementations, optical receiver 253 may include additional components, fewer components, different components, or differently arranged components.

Figure 6:
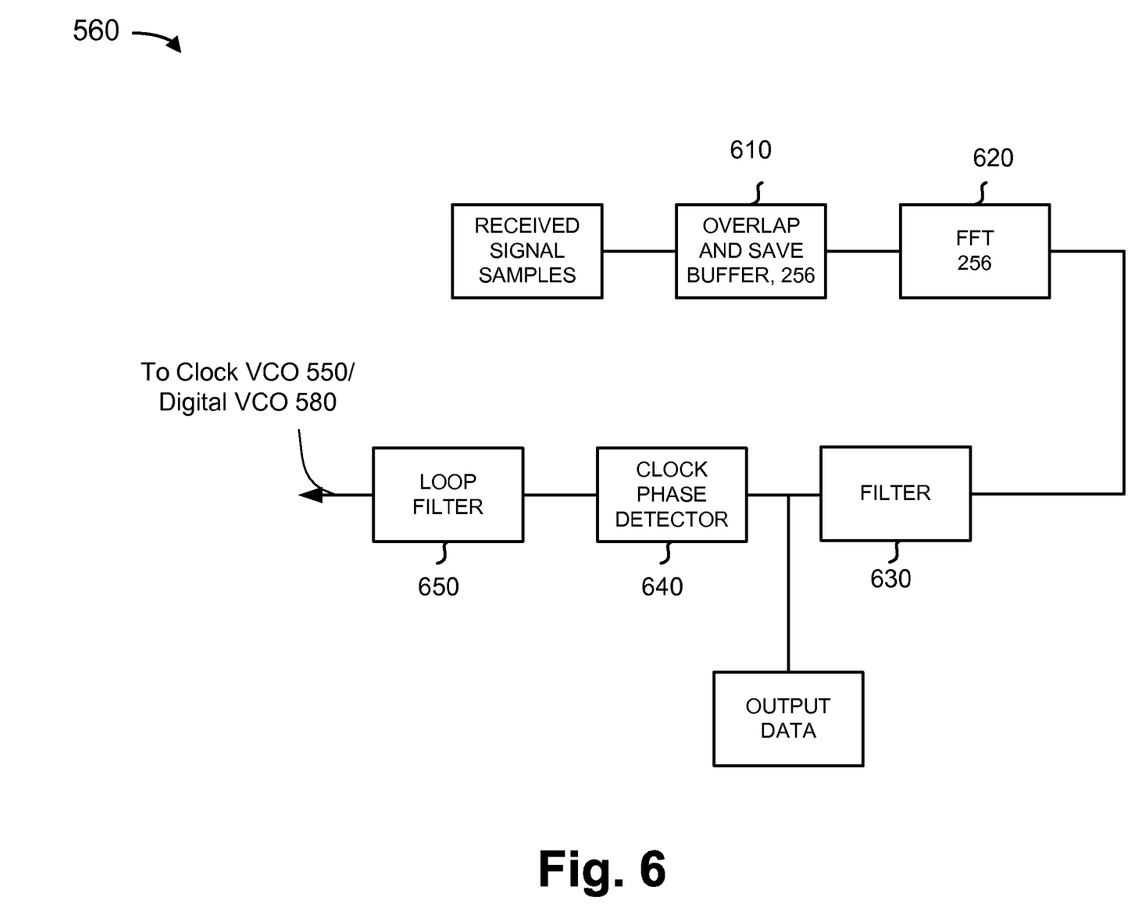
FIG. 6 illustrates example components of a receiver digital signal processor.

FIG. 6 illustrates example functional components of a RX DSP 560. The particular functional components, which may be included in RX DSP 560, may vary based on desired performance characteristics and/or computational complexity.

As shown in FIG. 6, RX DSP 560 may include overlap and save buffer component 610, FFT component 620, filter component 630, clock phase detector component 640, and loop filter 650.

In some implementations, overlap and save buffer 610 may receive signal samples from ADC 540 and may buffer 256 samples (assuming a 256-point FFT with a sampling frequency of twice the baud rate is used as an example), associated with the received signal samples. In some implementations, FFT component 620 may receive the 256 samples from overlap and save buffer 610, and may convert the samples from the time domain to the frequency domain using, for example, an FFT. FFT component 620 may form 256 frequency bins as a result of performing the FFT.

In some implementations, filter 630 may perform filtering functions to the 256 frequency bins, such as chromatic dispersion compensation filtering, and/or some other type of filtering. In some implementations, filter 630 may provide a filtered signal. In some implementations, a portion of the filtered signal may be provided as output data corresponding to output data shown in FIGS. 5A-5B (e.g., data associated with an input signal). In some implementations, another portion of the filtered signal may be provided to clock phase detector 640 such that a clock phase error, associated with the filtered signal, may be determined and corrected.

In some implementations, clock phase detector 640 may receive the filtered signal (corresponding to the 256 frequency bins), and may determine linear phase differences between frequency bins separated by a frequency of ½T. In some implementations, the linear phase differences may correspond to a clock phase error associated with the filtered signal. In some implementations, clock phase detector 640 may determine the clock phase error while the filtered signal is in the frequency domain. In some implementations, clock phase detector 640 may include a composite phase detector that can provide a composite clock phase error associated with x-pol signals and y-pol signals. In some implementations, clock phase detector 640 may determine the clock phase error (e.g., by determining the linear phase differences between frequency bins separated by the frequency ½T) using expression 1 shown below:

$$PD = \sum_{k=-32 \to +32} \text{Im} \quad (1)$$

$$\left\{ \left( \sum_{i=0 \to 63} X[i] \cdot X^*[i+192+k] \right) \cdot \left( \sum_{i=0 \to 63} X[i+192] \cdot X^*[i+k] \right)^* \right\}$$

where X[a] is the frequency response after Filter 630 at bin a.

As an example, assume k=0 and i=0. Given these assumptions, expression 1 can be simplified to expression 2 as follows:

$$(X[0] \cdot X^*[192]) \cdot (X[192] \cdot X^*[0])^* = \quad (2)$$

$$A[0] \cdot conj(A[192]e^{-j2\pi\tau/(2T)}) \cdot conj(A[192]e^{-j2\pi\tau/(2T)}) \cdot A[0] =$$

$$A[0] \cdot A^*[192]e^{j2\pi\tau/(2T)} \cdot A^*[192]e^{j2\pi\tau/(2T)}A[0] =$$

$$A^2[0](A^*[192])^2 e^{j2\pi\tau/T}$$

Thus, $$\text{Im}\{(X[0] \cdot X^*[192]) \cdot (X[192] \cdot X^*[0])^*\} =$$

$$\text{Im}\{A^2[0](A^*[192])^2 e^{j2\pi\tau/T}\} \propto K_d \sin(2\pi\tau/T)$$

In expression 2, (X[f]–X*[g]) contains the phase response difference between bins f and g. That is, (X[0]–X*[192]) contains the phase response differences between bins 0 and 192. Further, A[f] corresponds to the signal spectrum before timing error is applied. Timing error, τ may be added in the frequency domain as a linear phase, $e^{j2\pi*f*\tau}$. In expression 2, $K_d$ is a constant corresponding to a sensitivity of clock phase detector 640.

As shown expression 2, the timing error (e.g., clock phase error) may be directly measured based on linear phase differences associated with frequency bins separated by ½T. Further, X[0] and X[192] (corresponding to A[0] and A*[192] $e^{j2\pi\tau/(2T)}$) may each be squared, thereby forming a 4$^{th}$ power expression of the clock phase error.

As another example, assume that k=1 and i=0. Given these assumptions, expression 1 can be simplified to expression 3 below:

$$(X[0] \cdot X^*[193]) \cdot (X[192] \cdot X^*[1])^* \quad (3)$$

Expression 3 may represent the difference in linear phase responses between bins 0 to 193, separated by 1/(2T)–df (where df is a frequency resolution associated with an FFT) and the difference in linear phase responses between bins 192 and 1, separated by 1/(2T)+df. When later simplified, the frequency resolution terms may cancel out. Thus, expression 3 may simplify to expression 2. That is, expression 2 may apply for all values of k and i to determine clock phase difference.

In some implementations, clock phase detector 640 may provide a voltage corresponding to the clock phase error to loop filter 650. In some implementations, loop filter 650 may include a low-pass filter, or a second order loop filter to close the clock recovery loop. In some implementations, loop filter 650 may provide the voltage to clock VCO 550 or digital VCO 580.

As described above, clock VCO 550 may receive the voltage and may generate a clock or toggle sequence corresponding to the voltage and corresponding to the clock phase error. In some implementations, clock VCO 550 may provide the toggle sequence to ADC 540 to cause ADC 540 to provide the samples to RX DSP 560 at particular time instances (e.g., time instances corresponding to timing errors). Alternatively, digital VCO 580 may receive samples from ADC 540 and may interpolate the samples based on the received voltage (e.g., to provide interpolated samples, associated with the clock phase error corresponding to the voltage, to RX DSP 560).

In some implementations, the clock phase error may converge towards zero as clock VCO 550 provides toggle sequences to ADC 540 or as digital VCO 580 interpolates the samples, and as clock phase detector 640 provides voltages indicative of the clock phase error. In some implementations, clock VCO 550 or digital VCO 580 may achieve a lock-point when variations in the clock phase error, determined by clock phase detector 640, are within a particular threshold. In some implementations, the lock-point may correspond to a steady state of the phase-locked loop including ADC 540, clock VCO 550 (or digital VCO 580), and RX DSP 560. As a result, untracked clock jitter of the system may be reduced as the clock phase error converges towards zero.

While FIG. 6 shows RX DSP 560 as including a particular quantity and arrangement of functional components, in some implementations, RX DSP 560 may include additional functional components, fewer functional components, different functional components, or differently arranged functional components.

Figure 7:
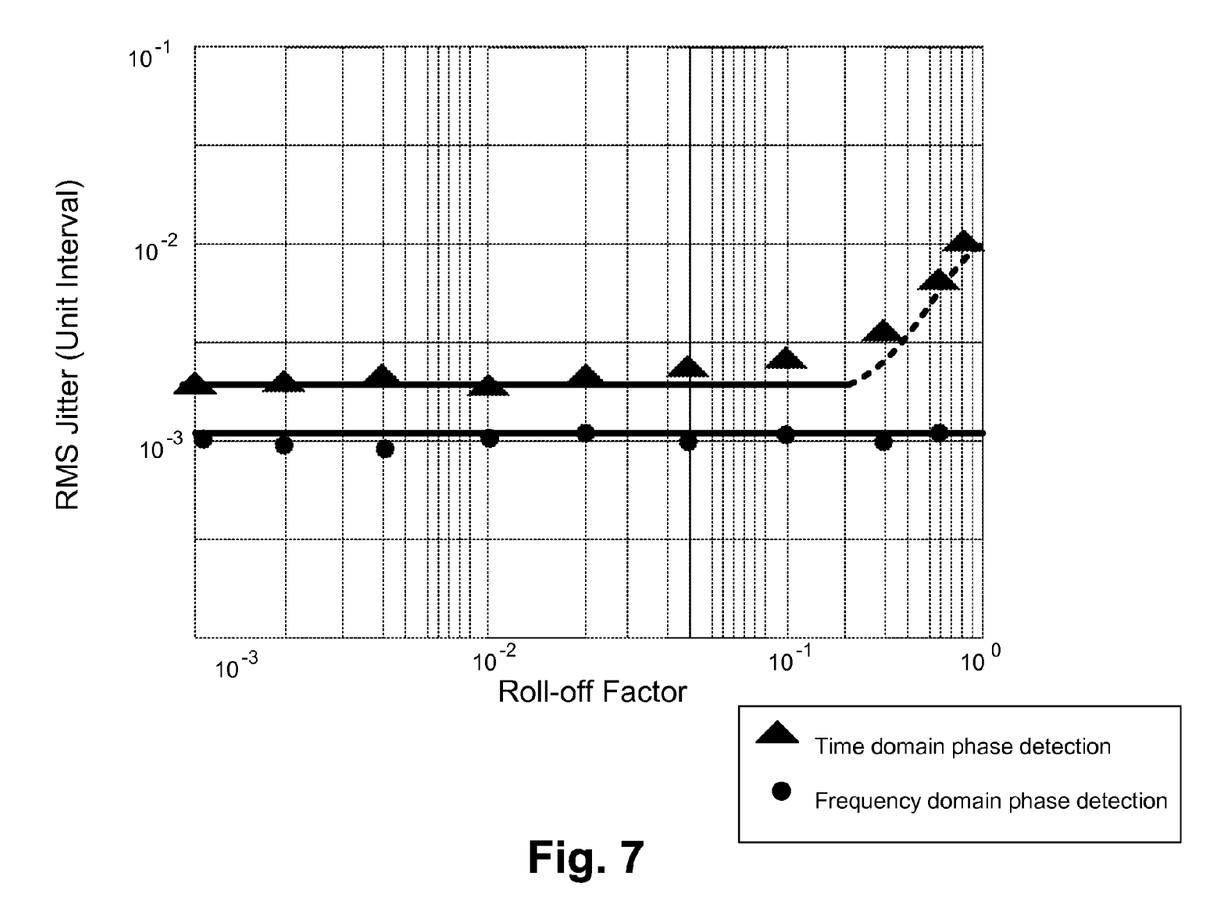
FIG. 7 illustrates a graph of signal jitter performance of a phase-locked loop having a time domain phase detector.

FIG. 7 illustrates a graph of example untracked clock jitter performance measurements (using a 200 kilohertz (KHz) loop bandwidth) of a phase-locked loop having a time domain phase detector. As shown in FIG. 7, the jitter for a signal (e.g., a first signal) associated with a phase-locked loop having a frequency domain phase detector, such as phase detector 640, may be lower in comparison of the jitter for a signal (e.g., a second signal) associated with a phase-locked loop having a time domain phase detector. In some implementations, the jitter may relate to variations in a lock-point achieved by clock VCO 550 or digital VCO 580 and may relate to phase noise of a signal.

While particular jitter performance measurements are shown in FIG. 7, in practice, the measurements may vary from what is shown in FIG. 7. For example, in practice, the jitter of the first signal may be less than what is shown in based on transmission characteristics of link 222, performance of filter 630, performance of loop filter 650, and/or based on some other factor.

As described above, phase differences between the phase responses of frequency bins that are separated by ½T may be used to identify timing errors (e.g., a clock phase error) in a signal having a roll-off factor as low as approximately 0.001. In some implementations, a voltage corresponding to a clock phase error may be provided to clock VCO 550 to cause VCO 550 to generate a clock or toggle sequence that may be used to correct for the clock phase error when implemented in a phase-locked loop. In some implementations, the jitter, associated with variations in a lock-point achieved by clock VCO 550 or digital VCO 580 using a frequency domain phase detection technique, may be reduced compared to the time domain phase detection technique for all possible roll-off factor values.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
   an analog-to-digital converter (ADC) configured to:
   output samples of a signal; and
   a digital signal processor (DSP) configured to:
   receive the samples from the ADC,
   convert the samples from a time domain to a frequency domain,
   determine a clock phase error of the samples while in the frequency domain, and
   provide a voltage corresponding to the clock phase error; and
   a voltage-controlled oscillator, the voltage being provided to the voltage-controlled oscillator to reduce timing errors associated with the samples, where when determining the clock phase error, the DSP is further configured to identify linear phase response differences between linear phase responses of frequency bins, associated with the samples, separated by ½T, where T is a symbol period, associated with the signal, and 1/T is a symbol rate or baud rate associated with the signal.

2. The system in accordance with claim 1,
   wherein the voltage-controlled oscillator is configured to:
   generate a toggle sequence based on the voltage, and
   provide the toggle sequence to the ADC to cause the ADC to provide the samples at time instances in accordance with the toggle sequence to reduce the timing errors associated with the samples.

3. The system in accordance with claim 1,
   wherein the voltage-controlled oscillator is a digital voltage-controlled oscillator, which is configured to:
   receive interpolate the samples, provided by the ADC, based on the voltage, and
   provide the interpolated samples to the DSP,
   the samples, received by the DSP, including the interpolated samples.

4. The system in accordance with claim 1, where the signal is associated with a roll-off factor in a range of approximately 0.001 to approximately 0.3.

5. The system in accordance with claim 1, further comprising:
   a local oscillator configured to provide a reference signal;
   a hybrid mixer configured to:
   receive an input signal,
   receive the reference signal, and
   provide an output signal having components associated with the input signal and the reference signal; and
   a photodetectors configured to:
   receive the output signal, and
   provide a voltage signal corresponding to the components,
   where the ADC is further configured to:
   receive the voltage signal and convert the voltage signal into a digital signal where the samples, outputted by the ADC, include samples of the digital signal.

6. A system, comprising:
an analog-to-digital converter (ADC) configured to:
output samples of a signal; and
a digital signal processor (DSP) configured to:
receive the samples from the ADC,
convert the samples from a time domain to a frequency domain,
determine a clock phase error of the samples while in the frequency domain, and
provide a voltage corresponding to the clock phase error; and
a voltage-controlled oscillator, the voltage being provided to the voltage-controlled oscillator to reduce timing errors associated with the samples, where when determining the clock phase error, the DSP is further configured to determine the clock phase error based on $K_d \sin(2\pi\tau/T)$, where $K_d$ is a constant corresponding to a sensitivity value of a clock phase detector, associated with the DSP, $\tau$ is a timing error, and T is a symbol period associated with the signal.

7. A system, comprising:
a digital signal processor (DSP) configured to:
receive samples of a signal from an analog-to-digital converter (ADC),
convert the samples from a time domain to a frequency domain,
determine a clock phase error of the samples while in the frequency domain; and
provide a voltage corresponding to the clock phase error; and
a voltage-controlled oscillator, the voltage being provided to the voltage-controlled oscillator to reduce timing errors associated with the samples, where when determining the clock phase error, the DSP is further configured to identify linear phase response differences between linear phase responses of frequency bins, associated with the samples, separated by ½T, where T is a symbol period, associated with the signal, and 1/T is a symbol rate or baud rate associated with the signal.

8. The system in accordance with claim 7, where the voltage causes the VCO to generate a toggle sequence based on the voltage, and provide the toggle sequence to the ADC to cause the ADC to provide the samples at time instances in accordance with the toggle sequence to reduce the timing errors associated with the samples.

9. The system in accordance with claim 7, where the voltage causes the digital VCO to interpolate the samples, provided by the ADC, based on the voltage, and provide the interpolated samples to the DSP, the samples, received by the DSP, including the interpolated samples.

10. The system in accordance with claim 7, where the signal is associated with a roll-off factor in a range of approximately 0.001 to approximately 0.3.

11. A system, comprising:
a digital signal processor (DSP) configured to:
receive samples of a signal from an analog-to-digital converter (ADC),
convert the samples from a time domain to a frequency domain,
determine a clock phase error of the samples while in the frequency domain; and
provide a voltage corresponding to the clock phase error; and
a voltage-controlled oscillator, the voltage being provided to the voltage-controlled oscillator,
where when determining the clock phase error, the DSP is further configured to determine the clock phase error based $K_d \sin(2\pi\tau/T)$, where $K_d$ is a constant corresponding to a sensitivity value of a clock phase detector, associated with the DSP, $\tau$ is a timing error, and T is a symbol period associated with the signal.

12. A system, comprising:
an analog-to-digital converter (ADC) configured to:
output samples of a signal,
the signal being associated with a roll-off factor in a range of approximately 0.001 to approximately 0.3;
a digital signal processor (DSP) configured to:
receive the samples from the ADC,
convert the samples from a time domain to a frequency domain,
identify linear phase response differences between linear phase responses of frequency bins, associated with the samples, separated by ½T, where T is a symbol period, associated with the signal, and 1/T is a symbol rate or baud rate associated with the signal, to determine a clock phase error of the samples while in the frequency domain; and
a voltage-controlled oscillator, the DSP providing a voltage corresponding to the clock phase error to the voltage-controlled oscillator to reduce timing errors associated with the samples.

13. The system in accordance with claim 12,
wherein the voltage-controlled oscillator is configured to:
generate a toggle sequence based on the voltage, and
provide the toggle sequence to the ADC to cause the ADC to provide the samples at time instances in accordance with the toggle sequence to reduce the timing errors associated with the samples.

14. The system in accordance with claim 12,
wherein the voltage-controlled oscillator is a digital voltage-controlled oscillator configured to:
interpolate the samples, provided by the ADC, based on the voltage, and
provide the interpolated samples to the DSP,
the samples, received by the DSP, including the interpolated samples.

15. The system in accordance with claim 12, where when determining the clock phase error, the DSP is further configured to determine the clock phase error based on the equation $K_d \sin(2\pi\tau/T)$, where $K_d$ is a constant corresponding to a sensitivity value of a clock phase detector, associated with the DSP, $\tau$ is a timing error, and T is a symbol period associated with the signal.

* * * * *